(12) United States Patent
Bauman et al.

(10) Patent No.: US 6,356,991 B1
(45) Date of Patent: *Mar. 12, 2002

(54) PROGRAMMABLE ADDRESS TRANSLATION SYSTEM

(75) Inventors: Mitchell A. Bauman, Circle Pines; Roger L. Gilbertson, Minneapolis, both of MN (US)

(73) Assignee: Unisys Corporation, Blue Bell, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,390

(22) Filed: Dec. 31, 1997

(51) Int. Cl.[7] .............................................. G06F 12/06
(52) U.S. Cl. ........................ 711/209; 711/206; 711/141; 711/148; 711/155; 711/157
(58) Field of Search ................................. 711/200, 202, 711/205, 206, 208, 112, 207, 209, 141, 147, 148, 155, 157, 163

(56) References Cited

U.S. PATENT DOCUMENTS

| | | | | |
|---|---|---|---|---|
| 4,355,355 A | * | 10/1982 | Butwell et al. | 711/208 |
| 5,117,350 A | * | 5/1992 | Parrish et al. | 711/202 |
| 5,293,593 A | * | 3/1994 | Hodge et al. | 711/202 |
| 5,375,213 A | * | 12/1994 | Arai | 711/208 |
| 5,787,476 A | * | 7/1998 | Laudon et al. | 711/141 |
| 5,900,020 A | * | 5/1999 | Safranek et al. | 711/167 |
| 5,909,691 A | * | 6/1999 | Schultz et al. | 711/4 |
| 5,913,923 A | * | 6/1999 | Dunlap et al. | 710/100 |
| 5,987,571 A | * | 11/1999 | Shibata et al. | 711/141 |
| 6,044,438 A | * | 3/2000 | Olnowich | 711/130 |
| 6,073,211 A | * | 6/2000 | Cheng et al. | 711/122 |

OTHER PUBLICATIONS

M.S. Yousif et al. "Cache Coherent in Multiprocessors: A Survey", Academic Press, Inc., pp. 127–177, 1995.*

* cited by examiner

Primary Examiner—Matthew Kim
Assistant Examiner—Pierre-Michel Bataille
(74) Attorney, Agent, or Firm—Beth L. McMahon; Michael B. Atlass; Charles A. Johnson (57) ABSTRACT

A programmable address translation system for a modular main memory is provided. The system is implemented using one or more General Register Arrays (GRAs), wherein each GRA performs logical-to-physical address translation for a predetermined address range within the system. Predetermined bits of a logical address are used to address a GRA associated with the logical address range. Data bits read from the GRA are then substituted for the predetermined bits of the logical address to form the physical address. In this manner, non-contiguous addressable banks of physical memory may be mapped to a selectable contiguous address range. By including within the GRA Address a number N of logical address bits used to address contiguous logical addresses, an address translation mechanism is provided which may be programmed to perform between 2-way and $2^N$-way address interleaving. Each GRA may be re-programmed dynamically to accommodate changing memory conditions as may occur, for example, when a range of memory is logically removed from a system because of errors. Furthermore, GRA reprogramming may occur while memory operations continue within other non-associated address ranges. Additionally, address interleaving may be selected for certain ones of the address ranges, whereas a non-interleaving scheme may be selected for other address ranges.

27 Claims, 9 Drawing Sheets

FIG. 1

MEMORY CLUSTER (MCL)
FIG. 3

FIG. 4
MEMORY CONTROLLER (MCA)

FIG. 5 - PHYSICAL TO LOGICAL ADDRESS MAPPING

LOGICAL - TO - PHYSICAL ADDRESS
FIG. 6

| LOGICAL ADDRESS (BITS) 710 | | | | | | | | | GRA ADDRESS (HEXIDECIMAL) 720 | | | GRA DATA (HEXIDECIMAL) 730 | | | PHYSICAL ADDRESS (BITS) 740 | | | | | | | | |
|---|---|---|---|---|---|---|---|---|---|---|---|---|---|---|---|---|---|---|---|---|---|---|
| 26 | 25 | 24 | 23 | 22 | 21 | 2 | 1 | 0 | | | | | | | 26 | 25 | 24 | 23 | 22 | 21 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 1 | 0 | 0 | 1 | 0 | 0 | 0 | 0 | 0 | 0 | 0 | 0 | 1 |
| 0 | 0 | 0 | 0 | 0 | 0 | 0 | 1 | 0 | 0 | 0 | 2 | 0 | 0 | 2 | 0 | 0 | 0 | 0 | 0 | 0 | 0 | 1 | 0 |
| 0 | 0 | 0 | 0 | 0 | 0 | 0 | 1 | 1 | 0 | 0 | 3 | 0 | 0 | 3 | 0 | 0 | 0 | 0 | 0 | 0 | 0 | 1 | 1 |
| 0 | 0 | 0 | 0 | 0 | 0 | 1 | 0 | 0 | 0 | 0 | 4 | 0 | 0 | 4 | 0 | 0 | 0 | 0 | 0 | 0 | 1 | 0 | 0 |
| 0 | 0 | 0 | 0 | 0 | 0 | 1 | 0 | 1 | 0 | 0 | 5 | 0 | 0 | 5 | 0 | 0 | 0 | 0 | 0 | 0 | 1 | 0 | 1 |
| 0 | 0 | 0 | 0 | 0 | 0 | 1 | 1 | 0 | 0 | 0 | 6 | 0 | 0 | 6 | 0 | 0 | 0 | 0 | 0 | 0 | 1 | 1 | 0 |
| 0 | 0 | 0 | 0 | 0 | 0 | 1 | 1 | 1 | 0 | 0 | 7 | 0 | 0 | 7 | 0 | 0 | 0 | 0 | 0 | 0 | 1 | 1 | 1 |
| 0 | 0 | 0 | 0 | 0 | 1 | 0 | 0 | 0 | 0 | 0 | 8 | 0 | 2 | 0 | 0 | 0 | 0 | 1 | 0 | 0 | 0 | 0 | 0 |
| 0 | 0 | 0 | 0 | 0 | 1 | 0 | 0 | 1 | 0 | 0 | 9 | 0 | 2 | 1 | 0 | 0 | 0 | 1 | 0 | 0 | 0 | 0 | 1 |
| 0 | 0 | 0 | 0 | 0 | 1 | 0 | 1 | 0 | 0 | 0 | A | 0 | 2 | 2 | 0 | 0 | 0 | 1 | 0 | 0 | 0 | 1 | 0 |
| 0 | 0 | 0 | 0 | 0 | 1 | 0 | 1 | 1 | 0 | 0 | B | 0 | 2 | 3 | 0 | 0 | 0 | 1 | 0 | 0 | 0 | 1 | 1 |
| 0 | 0 | 0 | 0 | 0 | 1 | 1 | 0 | 0 | 0 | 0 | C | 0 | 2 | 4 | 0 | 0 | 0 | 1 | 0 | 0 | 1 | 0 | 0 |
| 0 | 0 | 0 | 0 | 0 | 1 | 1 | 0 | 1 | 0 | 0 | D | 0 | 2 | 5 | 0 | 0 | 0 | 1 | 0 | 0 | 1 | 0 | 1 |
| 0 | 0 | 0 | 0 | 0 | 1 | 1 | 1 | 0 | 0 | 0 | E | 0 | 2 | 6 | 0 | 0 | 0 | 1 | 0 | 0 | 1 | 1 | 0 |
| 0 | 0 | 0 | 0 | 0 | 1 | 1 | 1 | 1 | 0 | 0 | F | 0 | 2 | 7 | 0 | 0 | 0 | 1 | 0 | 0 | 1 | 1 | 1 |
| 0 | 0 | 0 | 0 | 1 | 0 | 0 | 0 | 0 | 0 | 1 | 0 | 0 | 4 | 0 | 0 | 0 | 1 | 0 | 0 | 0 | 0 | 0 | 0 |
| 0 | 0 | 0 | 0 | 1 | 0 | 0 | 0 | 1 | 0 | 1 | 1 | 0 | 4 | 1 | 0 | 0 | 1 | 0 | 0 | 0 | 0 | 0 | 1 |
| 0 | 0 | 0 | 0 | 1 | 0 | 0 | 1 | 0 | 0 | 1 | 2 | 0 | 4 | 2 | 0 | 0 | 1 | 0 | 0 | 0 | 0 | 1 | 0 |
| 0 | 0 | 0 | 0 | 1 | 0 | 0 | 1 | 1 | 0 | 1 | 3 | 0 | 4 | 3 | 0 | 0 | 1 | 0 | 0 | 0 | 0 | 1 | 1 |
| 0 | 0 | 0 | 0 | 1 | 0 | 1 | 0 | 0 | 0 | 1 | 4 | 0 | 4 | 4 | 0 | 0 | 1 | 0 | 0 | 0 | 1 | 0 | 0 |
| 0 | 0 | 0 | 0 | 1 | 0 | 1 | 0 | 1 | 0 | 1 | 5 | 0 | 4 | 5 | 0 | 0 | 1 | 0 | 0 | 0 | 1 | 0 | 1 |
| 0 | 0 | 0 | 0 | 1 | 0 | 1 | 1 | 0 | 0 | 1 | 6 | 0 | 4 | 6 | 0 | 0 | 1 | 0 | 0 | 0 | 1 | 1 | 0 |
| 0 | 0 | 0 | 0 | 1 | 0 | 1 | 1 | 1 | 0 | 1 | 7 | 0 | 4 | 7 | 0 | 0 | 1 | 0 | 0 | 0 | 1 | 1 | 1 |
| 0 | 0 | 0 | 0 | 1 | 1 | 0 | 0 | 0 | 0 | 1 | 8 | 0 | 6 | 0 | 0 | 0 | 1 | 1 | 0 | 0 | 0 | 0 | 0 |
| 0 | 0 | 0 | 0 | 1 | 1 | 0 | 0 | 1 | 0 | 1 | 9 | 0 | 6 | 1 | 0 | 0 | 1 | 1 | 0 | 0 | 0 | 0 | 1 |
| 0 | 0 | 0 | 0 | 1 | 1 | 0 | 1 | 0 | 0 | 1 | A | 0 | 6 | 2 | 0 | 0 | 1 | 1 | 0 | 0 | 0 | 1 | 0 |
| 0 | 0 | 0 | 0 | 1 | 1 | 0 | 1 | 1 | 0 | 1 | B | 0 | 6 | 3 | 0 | 0 | 1 | 1 | 0 | 0 | 0 | 1 | 1 |
| 0 | 0 | 0 | 0 | 1 | 1 | 1 | 0 | 0 | 0 | 1 | C | 0 | 6 | 4 | 0 | 0 | 1 | 1 | 0 | 0 | 1 | 0 | 0 |
| 0 | 0 | 0 | 0 | 1 | 1 | 1 | 0 | 1 | 0 | 1 | D | 0 | 6 | 5 | 0 | 0 | 1 | 1 | 0 | 0 | 1 | 0 | 1 |
| 0 | 0 | 0 | 0 | 1 | 1 | 1 | 1 | 0 | 0 | 1 | E | 0 | 6 | 6 | 0 | 0 | 1 | 1 | 0 | 0 | 1 | 1 | 0 |
| 0 | 0 | 0 | 0 | 1 | 1 | 1 | 1 | 1 | 0 | 1 | F | 0 | 6 | 7 | 0 | 0 | 1 | 1 | 0 | 0 | 1 | 1 | 1 |

LOGICAL - TO - PHYSICAL ADDRESS
CONVERSION WITHOUT INTERLEAVE
FIG. 7

|  | LOGICAL ADDRESS (BITS) — 710 | | | | | | | | | GRA ADDRESS (HEXIDECIMAL) — 720 | | | GRA DATA (HEXIDECIMAL) — 730 | | | PHYSICAL ADDRESS (BITS) — 740 | | | | | | | | |
|---|---|---|---|---|---|---|---|---|---|---|---|---|---|---|---|---|---|---|---|---|---|---|---|---|
|  | 26 | 25 | 24 | 23 | 22 | 21 | 2 | 1 | 0 |  |  |  |  |  |  | 26 | 25 | 24 | 23 | 22 | 21 | 2 | 1 | 0 |
|  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 0 | 0 | 0 | 1 | 0 | 0 | 1 | 0 | 2 | 0 | 0 | 0 | 0 | 1 | 0 | 0 | 0 | 0 | 0 |
|  | 0 | 0 | 0 | 0 | 0 | 0 | 0 | 1 | 0 | 0 | 0 | 2 | 0 | 4 | 0 | 0 | 0 | 1 | 0 | 0 | 0 | 0 | 0 | 0 |
|  | 0 | 0 | 0 | 0 | 0 | 0 | 0 | 1 | 1 | 0 | 0 | 3 | 0 | 6 | 0 | 0 | 0 | 1 | 1 | 0 | 0 | 0 | 0 | 0 |
|  | 0 | 0 | 0 | 0 | 0 | 0 | 1 | 0 | 0 | 0 | 0 | 4 | 0 | 0 | 1 | 0 | 0 | 0 | 0 | 0 | 0 | 0 | 0 | 1 |
|  | 0 | 0 | 0 | 0 | 0 | 0 | 1 | 0 | 1 | 0 | 0 | 5 | 0 | 2 | 1 | 0 | 0 | 0 | 1 | 0 | 0 | 0 | 0 | 1 |
|  | 0 | 0 | 0 | 0 | 0 | 0 | 1 | 1 | 0 | 0 | 0 | 6 | 0 | 4 | 1 | 0 | 0 | 1 | 0 | 0 | 0 | 0 | 0 | 1 |
|  | 0 | 0 | 0 | 0 | 0 | 0 | 1 | 1 | 1 | 0 | 0 | 7 | 0 | 6 | 1 | 0 | 0 | 1 | 1 | 0 | 0 | 0 | 0 | 1 |
|  | 0 | 0 | 0 | 0 | 0 | 1 | 0 | 0 | 0 | 0 | 0 | 8 | 0 | 0 | 2 | 0 | 0 | 0 | 0 | 0 | 0 | 0 | 1 | 0 |
|  | 0 | 0 | 0 | 0 | 0 | 1 | 0 | 0 | 1 | 0 | 0 | 9 | 0 | 2 | 2 | 0 | 0 | 0 | 1 | 0 | 0 | 0 | 1 | 0 |
|  | 0 | 0 | 0 | 0 | 0 | 1 | 0 | 1 | 0 | 0 | 0 | A | 0 | 4 | 2 | 0 | 0 | 1 | 0 | 0 | 0 | 0 | 1 | 0 |
|  | 0 | 0 | 0 | 0 | 0 | 1 | 0 | 1 | 1 | 0 | 0 | B | 0 | 6 | 2 | 0 | 0 | 1 | 1 | 0 | 0 | 0 | 1 | 0 |
|  | 0 | 0 | 0 | 0 | 0 | 1 | 1 | 0 | 0 | 0 | 0 | C | 0 | 0 | 3 | 0 | 0 | 0 | 0 | 0 | 0 | 0 | 1 | 1 |
|  | 0 | 0 | 0 | 0 | 0 | 1 | 1 | 0 | 1 | 0 | 0 | D | 0 | 2 | 3 | 0 | 0 | 0 | 1 | 0 | 0 | 0 | 1 | 1 |
|  | 0 | 0 | 0 | 0 | 0 | 1 | 1 | 1 | 0 | 0 | 0 | E | 0 | 4 | 3 | 0 | 0 | 1 | 0 | 0 | 0 | 0 | 1 | 1 |
|  | 0 | 0 | 0 | 0 | 0 | 1 | 1 | 1 | 1 | 0 | 0 | F | 0 | 6 | 3 | 0 | 0 | 1 | 1 | 0 | 0 | 0 | 1 | 1 |
|  | 0 | 0 | 0 | 0 | 1 | 0 | 0 | 0 | 0 | 0 | 1 | 0 | 0 | 0 | 4 | 0 | 0 | 0 | 0 | 0 | 0 | 1 | 0 | 0 |
|  | 0 | 0 | 0 | 0 | 1 | 0 | 0 | 0 | 1 | 0 | 1 | 1 | 0 | 2 | 4 | 0 | 0 | 0 | 1 | 0 | 0 | 1 | 0 | 0 |
|  | 0 | 0 | 0 | 0 | 1 | 0 | 0 | 1 | 0 | 0 | 1 | 2 | 0 | 4 | 4 | 0 | 0 | 1 | 0 | 0 | 0 | 1 | 0 | 0 |
|  | 0 | 0 | 0 | 0 | 1 | 0 | 0 | 1 | 1 | 0 | 1 | 3 | 0 | 6 | 4 | 0 | 0 | 1 | 1 | 0 | 0 | 1 | 0 | 0 |
|  | 0 | 0 | 0 | 0 | 1 | 0 | 1 | 0 | 0 | 0 | 1 | 4 | 0 | 0 | 5 | 0 | 0 | 0 | 0 | 0 | 0 | 1 | 0 | 1 |
|  | 0 | 0 | 0 | 0 | 1 | 0 | 1 | 0 | 1 | 0 | 1 | 5 | 0 | 2 | 5 | 0 | 0 | 0 | 1 | 0 | 0 | 1 | 0 | 1 |
|  | 0 | 0 | 0 | 0 | 1 | 0 | 1 | 1 | 0 | 0 | 1 | 6 | 0 | 4 | 5 | 0 | 0 | 1 | 0 | 0 | 0 | 1 | 0 | 1 |
|  | 0 | 0 | 0 | 0 | 1 | 0 | 1 | 1 | 1 | 0 | 1 | 7 | 0 | 6 | 5 | 0 | 0 | 1 | 1 | 0 | 0 | 1 | 0 | 1 |
|  | 0 | 0 | 0 | 0 | 1 | 1 | 0 | 0 | 0 | 0 | 1 | 8 | 0 | 0 | 6 | 0 | 0 | 0 | 0 | 0 | 0 | 1 | 1 | 0 |
|  | 0 | 0 | 0 | 0 | 1 | 1 | 0 | 0 | 1 | 0 | 1 | 9 | 0 | 2 | 6 | 0 | 0 | 0 | 1 | 0 | 0 | 1 | 1 | 0 |
|  | 0 | 0 | 0 | 0 | 1 | 1 | 0 | 1 | 0 | 0 | 1 | A | 0 | 4 | 6 | 0 | 0 | 1 | 0 | 0 | 0 | 1 | 1 | 0 |
|  | 0 | 0 | 0 | 0 | 1 | 1 | 0 | 1 | 1 | 0 | 1 | B | 0 | 6 | 6 | 0 | 0 | 1 | 1 | 0 | 0 | 1 | 1 | 0 |
|  | 0 | 0 | 0 | 0 | 1 | 1 | 1 | 0 | 0 | 0 | 1 | C | 0 | 0 | 7 | 0 | 0 | 0 | 0 | 0 | 0 | 1 | 1 | 1 |
|  | 0 | 0 | 0 | 0 | 1 | 1 | 1 | 0 | 1 | 0 | 1 | D | 0 | 2 | 7 | 0 | 0 | 0 | 1 | 0 | 0 | 1 | 1 | 1 |
|  | 0 | 0 | 0 | 0 | 1 | 1 | 1 | 1 | 0 | 0 | 1 | E | 0 | 4 | 7 | 0 | 0 | 1 | 0 | 0 | 0 | 1 | 1 | 1 |
|  | 0 | 0 | 0 | 0 | 1 | 1 | 1 | 1 | 1 | 0 | 1 | F | 0 | 6 | 7 | 0 | 0 | 1 | 1 | 0 | 0 | 1 | 1 | 1 |

LOGICAL - TO - PHYSICAL ADDRESS CONVERSION WITH INTERLEAVE

FIG. 8

FIG. 9 - POD ADDRESS CONTROL BLOCK

PROGRAMMABLE ADDRESS TRANSLATION SYSTEM

CROSS-REFERENCE TO OTHER APPLICATIONS

The following co-pending applications of common assignee contain some common disclosure:

"High Performance Modular Memory System with Crossbar Connections", Attorney Docket No. RA5096, filed Dec. 31, 1997, Ser. No. 09/001,592 and incorporated herein by reference in its entirety.

BACKGROUND OF THE INVENTION

1. Field of the Invention

This invention relates generally to a memory system for use within a large-scale multiprocessor system; and, more specifically, to a programmable system and method for performing address translation and interleave functions in an expandable, modular main memory system.

2. Description of the Prior Art

In data processing systems, devices acting as masters, for example, processors, generally provide address signals to enable, and obtain access to, other devices such as memories acting as slaves. A master is generally programmed to expect that the assertion of a predetermined set of address signals (an address) will enable a predetermined physical slave device. In other words, from the point of view of the master, one or more addresses are "mapped" to a predetermined physical slave device.

Often the set of address signals provided by a master, which may be referred to as a "logical address", is either the same set, or a super set, of the set of address signals provided to the physical slave device. That is, the logical address is equivalent to the "physical address". Sometimes, however, it is desirable to modify, or translate, a logical address before it is provided to a slave device so that the logical address is not equivalent to the physical address. In such a case, the set of address signals provided by the master is not the same set of address signals used to enable the slave.

Address translation may be performed for a variety of reasons. Address translation may be performed by software associated with a processor's operating system so that addresses used by the operating system and other application programs running under the operation system are completely independent of the hardware. The software involved in the translation process may be referred as "paging" software because the physical-to-logical memory mapping is performed on a unit of memory called a "page". Many large-scale data processing system use this type of paging software to accomplish address translation.

Although paging provides one method of mapping logical addresses to physical addresses, many operating systems and software applications, particularly those designed for smaller-scale systems, are not capable of interfacing with paging-type software. Some of these operating systems and applications are associated with industry-standard platform specifications, for example, the Intel MultiProcessor Specification promulgated by the Intel Corporation. Often such platform specifications define a logical address mapping, for example, a contiguous address range based at a predetermined address, which must be provided by compliant systems. To meet these requirements, some form of address translation other than paging is often required.

In addition to allowing systems to be hardware independent and industry-standard compliant, address translation may also be performed to achieve increased parallelism. For example, in the case of a processor performing a series of memory read operations to contiguous logical memory addresses, increased parallelism may be achieved by mapping the contiguous logical addresses to different physical memory devices. In this manner, the successively performed read operations may be performed within multiple physical devices simultaneously, thereby increasing memory throughput. This is referred to as memory "interleaving".

In prior art systems, memory interleaving is accomplished in hardware. Therefore, although these prior art interleave schemes may be enabled or disabled, they may not be programmably altered. Even the more flexible prior art interleave mechanisms, such as that offered by the 2200/3900 system commercially available from the Unisys Corporation, are hardware-based and provide only a two-way or a four-way interleave option. Moreover, the selected interleave option must be applied to the entire memory address range. Thus, in prior art systems, available interleave selections often do not accommodate particular system configurations, or handle those situations in which memory devices are added to, or removed from, the system. Finally, since prior art systems apply a selected interleave scheme to the entire memory address range, changing the interleave scheme requires temporarily suspending all memory operations. These attributes are not desirable for a large-scale modular memory system and a more flexible approach to address translation is therefore desired.

OBJECTS

The primary object of the invention is to provide an improved memory mapping system for a modular main memory;

A further object of the invention is to provide a memory mapping system capable of being programmably altered;

A still further object of the invention is to provide a memory mapping system capable of supporting a programmable interleaving mechanism;

Another object of the invention is to provide a programmable system for supporting interleaved memory mapping for between one and a predetermined number of physical memory devices;

A yet further object of the invention is to provide a memory system wherein operations performed to selectable address ranges within the memory system are interleaved, and wherein operations performed to other selectable address ranges within the memory system are not interleaved;

Another object of the invention is to provide a memory system having multiple memory sub-systems each having a programmable memory-mapping mechanism, and wherein the memory map may be programmably modified for one or more of the memory sub-systems while memory requests continue to be processed by others of the memory sub-systems;

Yet another object of the invention is to provide a memory system having a programmable memory mapping circuit capable of programmably removing degraded memory ranges from usable memory space;

A still further object of the invention is to provide a memory mapping scheme for a large-scale data processing system wherein non-contiguous physical memory addresses are mapped to contiguous logical addresses starting at a predetermined logical address;

Another object of the invention is to provide a method of automatically ascertaining the size of available physical memory, then automatically programming a memory map based on available physical memory size.

SUMMARY OF THE INVENTION

The objectives of the present invention are achieved in a programmable address translation system for a modular main memory. The system is implemented using one or more General Register Arrays (GRAs), wherein each GRA performs logical-to-physical address translation for a predetermined address range within the system. Predetermined bits of a logical address are used to address a GRA associated with the logical address range. Data bits read from the GRA are then substituted for the predetermined bits of the logical address to form the physical address. In this manner, non-contiguous addressable banks of physical memory may be mapped to a selectable contiguous logical address range, thereby providing a memory system complying with any number of industry-standard platform specifications. By including within the GRA Address a number N of logical address bits used to address contiguous logical addresses, an address translation mechanism is provided which may be programmed to perform between 2-way and $2^N$-way address interleaving. Each GRA may be re-programmed dynamically to accommodate changing memory conditions as may occur, for example, when a range of memory is logically removed from a system because of errors. Furthermore, because of the modularity of the design, GRA re-programming may occur while memory operations continue within non-associated address ranges. Additionally, address interleaving may be selected for certain address ranges while not for others, thereby allowing the address translation scheme to be tailored to memory usage. For example, address interleaving may be selected for those memory ranges storing primarily instructions and therefore involving predominantly contiguous memory accesses, whereas non-interleaved address translation may be selected for other address ranges.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF OF THE DESCRIPTION OF THE FIGURES

The present invention will be described with reference to the accompanying drawings.

FIG. 8 is a table illustrating logical-to-physical address conversion when four-way interleaving is employed.

DETAILED DESCRIPTION OF THE PREFERRED EMBODIMENTS

System of the Preferred Embodiment

Figure 1:
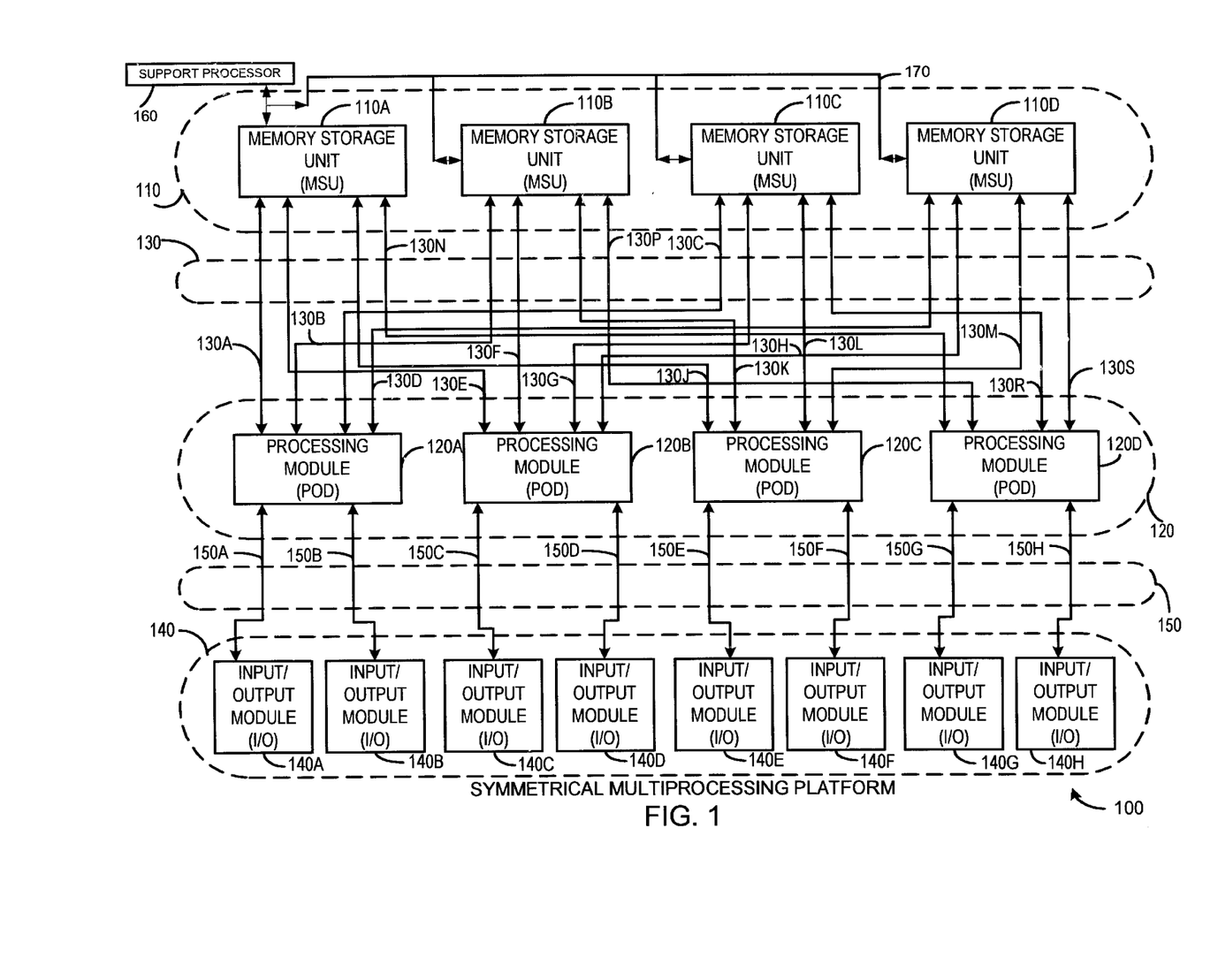
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processor Modules (PODs) in dashed block 120 individually shown as POD 120A, POD 120B, POD 120C, and POD 120D. Each unit in MSU 110 is interfaced to all units in POD 120 via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, each of the MI interfaces comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK). In a preferred embodiment of the present invention, the system clock frequency is 100 megahertz (MHZ).

Any POD has direct access to data in any MSU via one of MIs. For example, MI 130A allows POD 120A direct access to MSU 110A and MI 130F allows POD 120B direct access to MSU 110B. PODs and MSUs are discussed in further detail below.

System Platform 100 further comprises Input/Output (I/O) Modules in dashed block 140 individually shown as I/O Modules 140A through 140H, which provide the interface between various Input/Output devices and one of the PODs. Each I/O Module is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but in the preferred embodiment have a transfer rate that is approximately half the transfer rate of the MI Interfaces because the I/O Modules 140 are located at a greater distance from the PODs 120 than are the MSUs 110.

System Platform 100 interfaces to Support Processor 160 via a Scan Interface 170. In the preferred embodiment, Scan Interface is a high-speed serial scan interface that complies with IEEE TAP Linker Specification 1149.1. As in known in the art, Support Processor 160 uses Scan Interface 170 to write various serial scan registers within Platform 100 to an initialization state during system initialization, system reset, or system re-configuration. Support Processor 160 may further use this interface to read the contents of various serial scan registers within Platform 100 to confirm system configuration, or to determine hardware availability. The use of Scan Interface 170 will be discussed further below.

Figure 2:
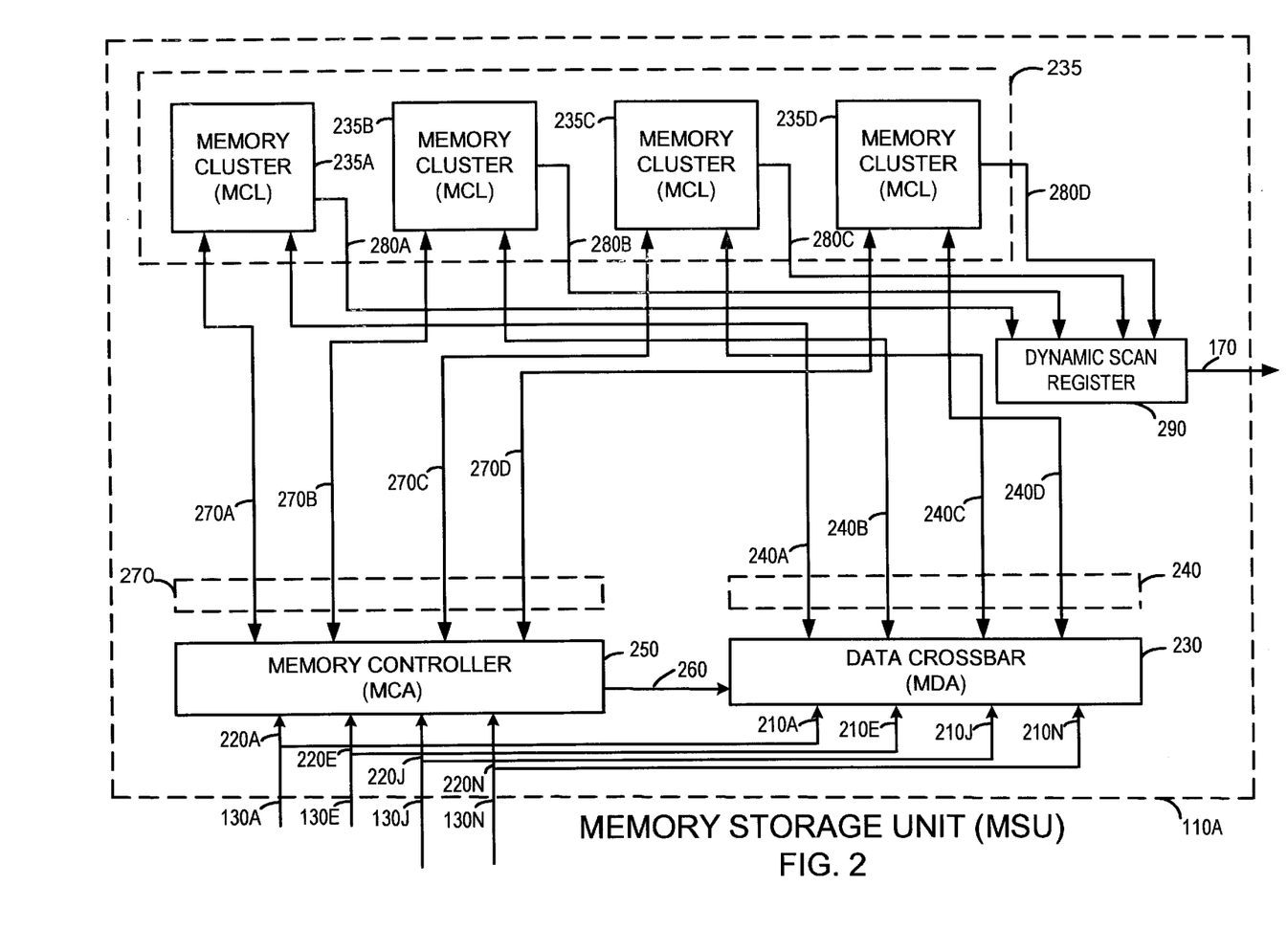
FIG. 2 is a block diagram of a Memory Storage Unit (MSU)

FIG. 2 is a block diagram of a Memory Storage Unit (MSU) 110A of the preferred embodiment. Although MSU 110A is shown and discussed, it is understood that this discussion applies equally to each of the MSUs. As discussed above, MSU 110A interfaces to each of the PODs 120A, 120B, 120C, and 120D across dedicated point-to-point MI Interfaces 130A, 130E, 130J, and 130N, respectively. Each MI Interface contains Data Lines shown as 210A, 210E, 210J, and 210N, wherein each set of Data Lines includes sixty-four bi-directional data bits, data parity bits, data strobe lines, and error signals (not individually shown.) Each set of Data Lines is therefore capable of transferring eight bytes of data at one time. In addition, each MI Interface 130 includes bi-directional Address/command Lines shown as 220A, 220E, 220J, and 220N. Each set of Address/command Lines includes bi-directional address signals, a response signal, hold lines, address parity, and early warning and request/arbitrate lines.

A first set of unidirectional control lines from a POD to the MSU are associated with each set of the Data Lines 210A, 210E, 210J, and 210N, and a second set of unidirectional control lines from the MSU to each of the PODs are further associated with the Address/command Lines 220A, 220E, 220J, and 220N. During a typical data transfer, the address/command information is conveyed in two transfers that each occur at the system clock rate of 100 Megahertz. The associated data is transferred in a sixty-four-byte packet called a cache line that requires eight eight-byte source synchronous transfers to complete, wherein each transfer occurs at a frequency that is twice that of the system clock.

Data Lines 210A, 210E, 210J, and 210N interface to the Memory Data Crossbar (MDA) 230. The NMDA 230 buffers data received on any of Data Lines 210, and provides the switching mechanism that routes this data to an addressed one of the storage sub-units called Memory Clusters (MCLs) in dashed block 235 shown individually as 235A, 235B, 235C, and 235D. The data is provided to the MCLs 235 on a dedicated one of the Data Buses in dashed block 240 individually shown as Data Bus 240A, 240B, 240C, and 240D, each of which is 128 data bits wide and runs at the frequency of the system clock. Since each of the Data Buses 240 is twice as wide as Data Lines 210, only four data transfers are required across Data Bus 240 to transmit a 64-byte cache line to the addressed one of the MCLs 280. Data Buses 240 are also used to transfer data from one of the MCLs to a requesting one of the PODs 120 via MDA 230 during a fetch operation.

Control for the MDA 230 is provided by the Memory Controller (MCA) 250. MCA queues memory requests, and provides timing and routing control information to the MDA across Control Lines 260. The MCA 250 also buffers address, command and control information received on Address/command lines 220A, 220E, 220J, and 220N, and provides request addresses to the appropriate memory device across Address Lines in dashed block 270, shown individually as 270A, 270B, 270C, and 270D, in a manner to be described further below. As discussed above, for operations that require access to the MCLs 235, the address information determines which of the MCLs 235 will receive the memory request.

As shown in FIG. 2, the memory associated with MSU 110A is organized into up to four Memory Clusters (MCLs) shown as MCL 235A, MCL 235B, MCL 235C, and MCL 235D. However, the MSU may be populated with as few as one MCL if the user so desires. Each MCL includes arrays of Synchronous Dynamic Random Access memory (SDRAM) devices and associated drivers and transceivers. MCL 235A, 235B, 235C, and 235D is each serviced by one of the independent bi-directional Data Buses 240A, 240B, 240C, and 240D, respectively, where each of the Data Buses 240 includes 128 data bits. Each MCL 235A, 235B, 235C, and 235D is further serviced by one of the independent set of the Address Lines 270A, 270B, 270C, and 270D, respectively.

In the preferred embodiment, Data Buses 240 are capable of transferring a 64-byte cache line of data to/from each of the MCLs 235 in five bus cycles, wherein each bus cycle corresponds to one cycle of the system clock. This five-cycle transfer includes one bus cycle for each of the four sixteen-byte data transfer operations associated with a 64-byte cache line, plus an additional bus cycle to switch drivers on the bus. The system is designed to allow four memory requests to be occurring simultaneously but in varying phases of completion to a single MCL. To allow this interlacing of requests to occur, each set of Address Lines 270 includes two address buses and independent control lines.

Each of the MCLs 235 is coupled to a respective one of the Serial Interfaces 280 (shown as Serial Interfaces 280A, 280B, 280C, and 280D.) Each of Serial Interfaces 280 further interfaces to Dynamic Scan Register 290, which may be read by the Support Processor 160 via Scan Interface 170. Dynamic Scan Register 290 captures information used by the Support Processor 160 to determine the size of memory present within MSU 110A in a manner to be discussed below.

Figure 3:
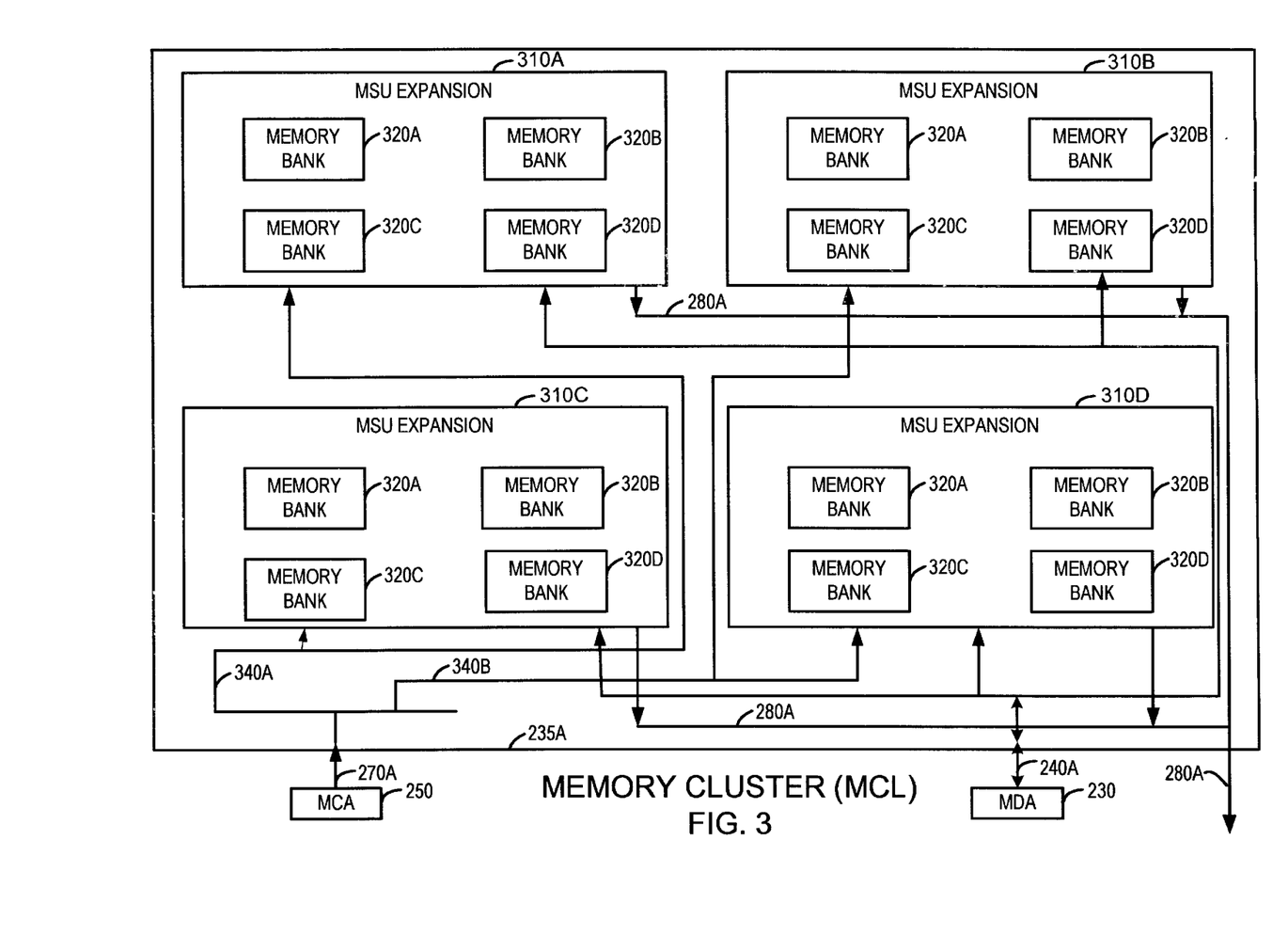
FIG. 3 is a block diagram of a Memory Cluster (MCL)

FIG. 3 is a block diagram of Memory Cluster (MCL) 23 5A. Although MCL 235A is shown and described, the following discussion applies equally to all MCLs. An MCL contains between one and four MSU Expansions 310A, 310B, 310C, and 310D as dictated by user needs. A minimally-populated MSU will contain at least one MSU Expansion. In the system of the preferred embodiment, each MSU Expansion may be populated with one, two, or four banks of memory shown as Memory Banks 320A, 320B, 320C, and 320D for a fully populated MSU Expansion. Each of the Memory Banks can logically be considered a storage device including 128 Megabytes of Synchronous Dynamic Random Access Memory (SDRAM), and Memory Banks are always added to provide a contiguous address range within the MSU Expansion. A fully populated MSU includes 16 MSU Expansions, and 64 Memory Banks for a total memory capacity of 8 Gigabytes.

Each of the Memory Banks 320 interfaces to the bi-directional Data Bus 240A which also interfaces with the MDA 230. Each of the Memory Banks further receives selected ones of the uni-directional Address Lines 270A driven by the MCA 250. Address Lines 270A includes two Address Buses 340 (shown as 340A and 340B), one for each pair of MSU Expansions 310. Memory Banks within Address Expansions 310A and 310C receive Address Bus 340A, and Memory Banks within Address Expansions 310B and 310D receive Address Bus 340B. During any memory operation, an address provided by one of the PODs 120 is used to select one of the 16 MSU Expansions 310, and one of the four Memory Banks 320 within the selected MSU Expansion. The MCA provides the necessary address signals and control lines to the selected one of the Memory Banks 320 in the timing sequence required by the commercially-available SDRAMs populating these Memory Banks. The associated data transfer is accomplished during a series of four 128-bit data transfers, with one transfer occurring every 10 nanoseconds (one clock cycle) across Data Bus 240A. After each of the transfers, logic within the addressed Memory Bank 320 automatically increments the address internally in predetermined fashion.

Because of the dual address bus structure of the MCL, the MCA 250 is capable of providing address and control signals to two Memory Banks 320 within the same MCL in parallel. Moreover, at least four operations may be occurring within a MCL at once. The data transfers associated with memory operations being performed in parallel are interleaved on Data Bus 240A so that maximum system throughput is achieved as will be discussed further below.

Each of the MSU Expansions 310 includes logic that drives respective ones of the signals included within Serial Interface 280A to predetermined logical levels to indicate which of Memory Banks 320 are present within the MSU Expansion. The absence of an entire MSU Expansion is indicated by biasing the respective ones of the signals to a predetermined logic level. Since Serial Interface 280A is readable by Support Processor 160 via Scan Interface 170, the Support Processor is capable of thereby determining which of the Memory Banks 320 are physically present within Platform 100.

Figure 4:
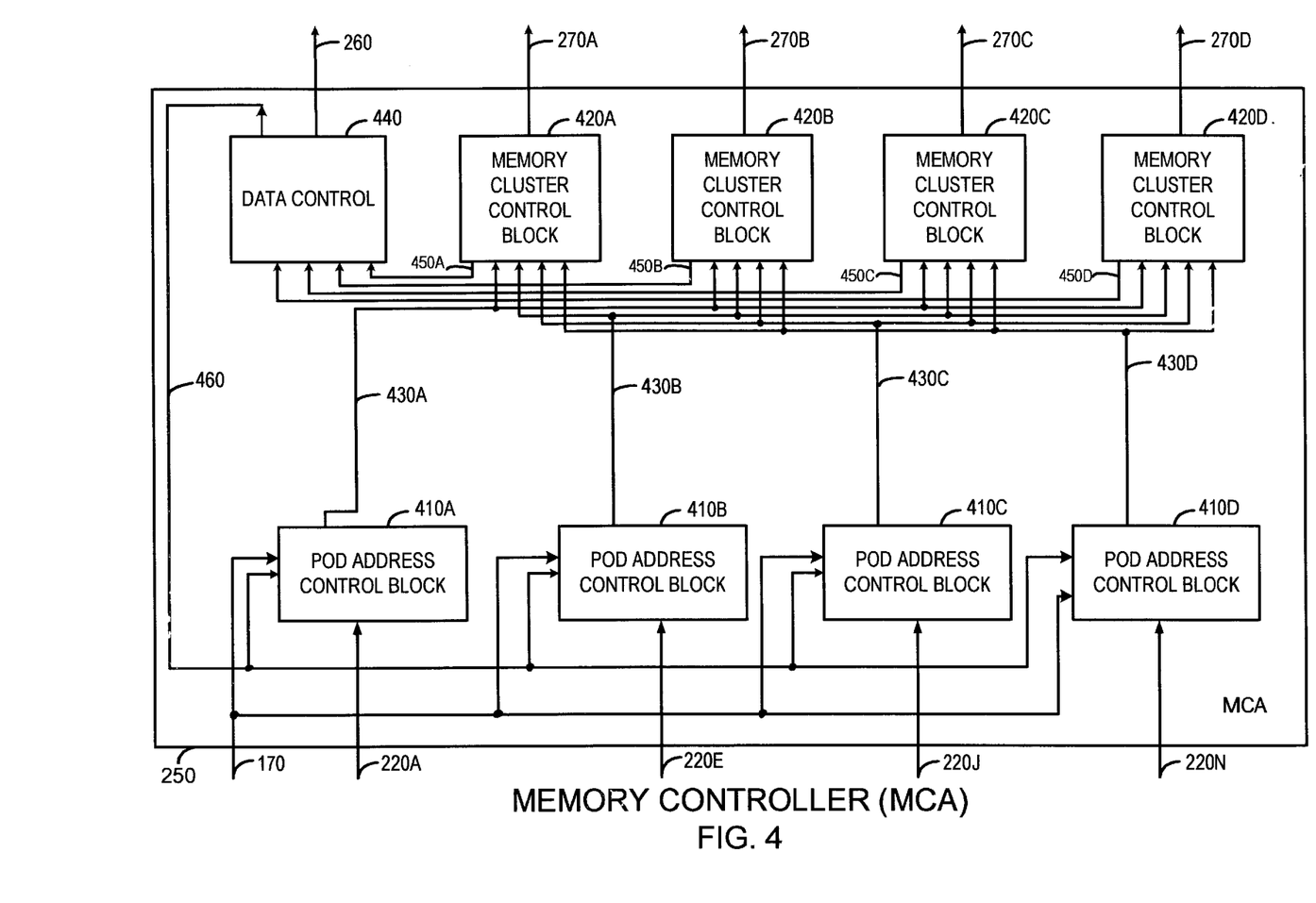
FIG. 4 is a block diagram of a Memory Controller (MCA)

FIG. 4 is a block diagram of the Memory Controller (MCA) 250. A POD 120 provides the address and associated command to the appropriate MSU 110 via respective ones of the Address/command Lines 220. For example, POD 120A provides an address and command over Address/command Lines 220A to POD Address Control Block 410A, and so on. Address/command Lines 220 include bi-directional address signals, an output response signal, and various request, arbitrate and hold lines to control the flow of information to and from the respective one of the PODs 120. POD Address Control Blocks 410A, 410B, 410C, and 410D include logic which re-maps the addresses received from the PODs to addresses used to address ones of the Memory Banks. These translated addresses are then stored until they are selected for processing.

When an address is selected as the next request address to process, it is provided to a selected one of the Memory Cluster Control Blocks 420A, 420B, 420C, and 420D via unidirectional address/control signals shown as Lines 430A, 430B, 430C, and 430D, respectively, based on the address. In a fully populated MSU, each of the Memory Cluster Control Blocks 420 handles one-fourth of the address range of the MSU. The selected Memory Cluster Control Blocks 420A, 420B, 420C, and 420D stores an address until it is selected for presentation to the associated MCL 235A, 235B, 23SC, and 235D, respectively, across Address Lines 270A, 270B, 270C, and 270D, respectively. For example, addresses from Memory Cluster Control Block 420A are presented to MCL 235A across Address Lines 270A, and so on. Memory Cluster Control 420 selects an address for transfer to an MCL 235 based on which MSU Expansion 310 within the MCL 235 becomes available first to accept another request.

When a Memory Cluster Control Block 420 selects an address for transfer to one of the MCLs 235 via the respective Address Lines 270, the Memory Cluster Control Block makes a request to Data Control 440 on an associated Request Line 450 (shown as Request Lines 450A, 450B, 450C, and 450D). For example, prior to a transfer of an address from Memory Cluster Control Block 420A to MCL 235A, Memory Cluster Control Block makes a request on Line 450A to Data Control 440. In response, Data Control 440 provides the necessary control information on Line 260 to the MDA 230 to allow the MDA to route data signals between the associated POD 120 and the associated MCL 235.

Logical to Physical Address Mapping

The above description of Platform 100 illustrates the modular, expandable nature of MSUs 110. Each MSU includes between one and four MCLs 235, which in turn includes between one and four MSU Expansions 310. Each MSU Expansion includes one, two, or four Memory Banks 320. Therefore, an MSU includes between one and sixty-four Memory Banks 320.

As discussed above, the user may customize an MSU to meet individual needs. For example, a system may be configured to include one MCL 410 having four MSU Expansions, each with a single Memory Bank. The memory capacity of such a system could be readily expanded by adding additional Memory Banks as memory needs increase. However, such a system may pose memory mapping problems as becomes evident in the following discussion of the logical-to-physical address mappings for the MSU of Platform 100.

Figure 5:
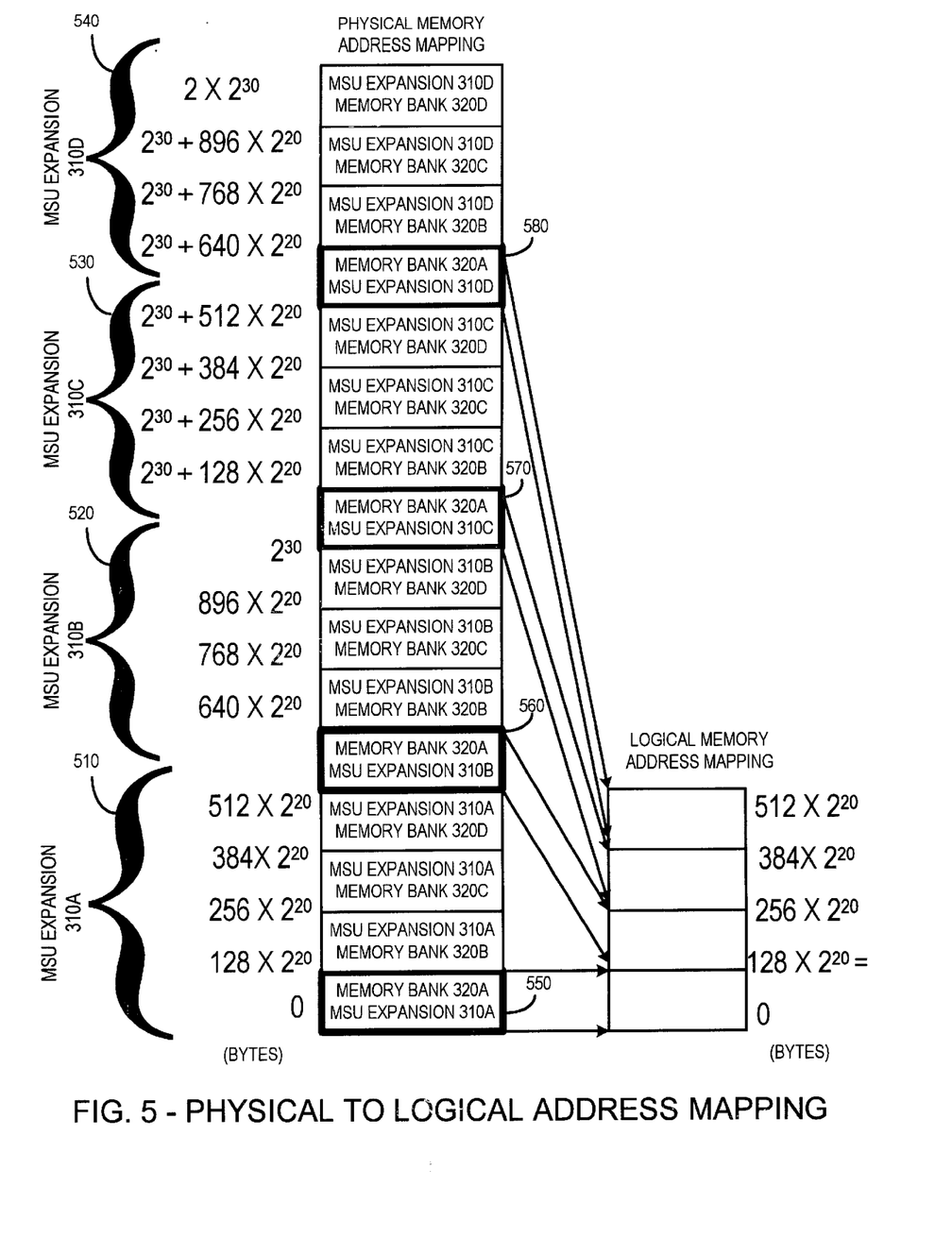
FIG. 5 is an address map which illustrates the logical-to-physical address translation in the system of the preferred embodiment.

FIG. 5 is an address map which illustrates the logical-to-physical address translation in the system of the preferred embodiment. The physical memory addresses are those used to access the physical hardware associated with Memory Banks 320. In contrast, the logical memory addresses are those issued by processors within PODs 120 to access instructions and data. In other words, a physical memory map represents the memory address definitions from the MSU hardware point of view, whereas the logical memory addresses are those used by software executing on the processors within a POD 120.

The physical memory address mappings shown in FIG. 5 represents the 2 Gigabytes of memory which would be included within the sixteen 128-Megabyte (Mbyte) Memory Banks 320 of a fully populated MCL 235. Assume the 2 Gigabytes starts at address 0. Assume further that the first 512 Megabytes maps to MSU Expansion 310A of FIG. 3 as shown by Address Range 510. The second, third, and fourth 512 Mbytes ranges map to MSU Expansions 310B, 310C, and 310D respectively, as shown by Address Ranges 520, 530, and 540, respectively. Within each of the above-mentioned 512 Mbyte blocks, the lowest 128 Mbytes is assigned to Memory Bank 320A of the respective MSU Expansion, followed by a memory range assigned to each of Memory Banks 320B, 320C, and 320D for the respective MSU Expansion as is further shown in FIG. 5.

The Addresses shown in FIG. 5 to be associated with Address Ranges 510, 520, 530, and 540 represent the physical address signals which will enable hardware. The address mappings are fixed, and do not change when the number of Memory Banks actually populating a MCL changes. When a MCL is only partially populated, unused memory ranges exist. This can further be seen from FIG. 5 which illustrates the case discussed above wherein a MCL is populated with four MSU Expansions, each of which is populated with only Memory Bank 320A. Thus only the four 128 Mbyte Memory Ranges 550, 560, 570, and 580 are actually associated with memory devices, and all of the other twelve 128-Mbyte blocks in the physical memory address map are unused.

In large-scale prior art data processing systems such as the one shown in FIG. 1, having a non-contiguous physical address map as shown in FIG. 5 is not problematic. The operating systems and other device drivers within these large data processing systems are generally designed to handle non-contiguous address ranges, and are further capable of handling a physical address range that does not start at a predetermined physical address. Furthermore, these large-scale systems often utilize paging software to allow software to operate independently from the physical address map. However, the software designed to execute on some smaller systems is not capable of handling this type of memory mapping. For example, some off-the-shelf operating systems such as various UNIX operating systems, and other operating systems commercially available from the MicroSoft Corporation, must be mapped to a contiguous logical memory range starting at a predetermined logical memory location. Additionally, some industry standard platform definitions such as the Intel MultiProcessor Specification version 1.4 available from the Intel Corporation require a main system memory having a contiguous logical address range based at a predetermined address. These off-the-shelf products do not readily interface to software memory mapping solutions such as paging software, and therefore an alternate method of performing address translation is needed.

Since it is desirable to make Platform 100 of FIG. 1 conform to a wide variety of industry standards, a mechanism is needed to make a non-contiguous physical address range appear as being a contiguous logical memory range starting at a predefined address, and this must be accomplished without the use of software paging. The desired mapping is illustrated in FIG. 5, which shows the four 128 Mbyte address ranges 550, 560, 570, and 580 being mapped to a logical address range based at a predetermined address of Address 0 and extending to Address $512 \times 22^{20}$ (in bytes.)

As discussed above, an MSU may be populated in many different ways. Therefore it is desirable that the address mapping function be variable. Moreover, since memory errors may degrade certain address ranges during system operation causing these address ranges to be unusable, it is desirable to have an address mapping function that may be dynamically re-programmed so that these address ranges may be removed from the address map. The current invention provides a system to selectively map logical to physical memory addresses, and to provide the capability discussed above.

Address Mapping for Interleave

As discussed above, a programmable address translation system allows non-contiguous physical memory blocks to be relocated into a contiguous memory range. A programmable memory map system would also providing a variable memory interleaving mechanism.

Memory interleaving relates to the capability of allowing multiple memory operations to occur simultaneously. As was discussed above, the dual address bus structure of each of the MCLs 235 allows two MSU Expansions 320 within an MCL 235 to process memory requests substantially simultaneously. The modular MSU design further allows each of the MCLs 310 to process memory requests in parallel to thereby support the interleaving of memory requests. However, to take full advantage of this capability, memory requests must be submitted at approximately the same rate to each of the MSU Expansions. Since memory references by the data processors, in this case, the processors residing on PODs 120, generally occur to contiguous logical blocks of memory, it is desirable to map contiguous addresses to different physical devices so that these requests may be processed in parallel. This is what is referred to as interleaving requests to memory.

Prior art interleaving schemes are implemented with logical gates. These interleaving schemes are either disabled entirely or enabled to perform interleaving between a predetermined, non-variable number of physical devices. Thus, as more memory is added to the system, interleaving may not be adjusted to take advantage of additional parallelism. A programmable interleaving memory map scheme is therefore desirable.

Description of the Invention of the Preferred Embodiment

Figure 6:
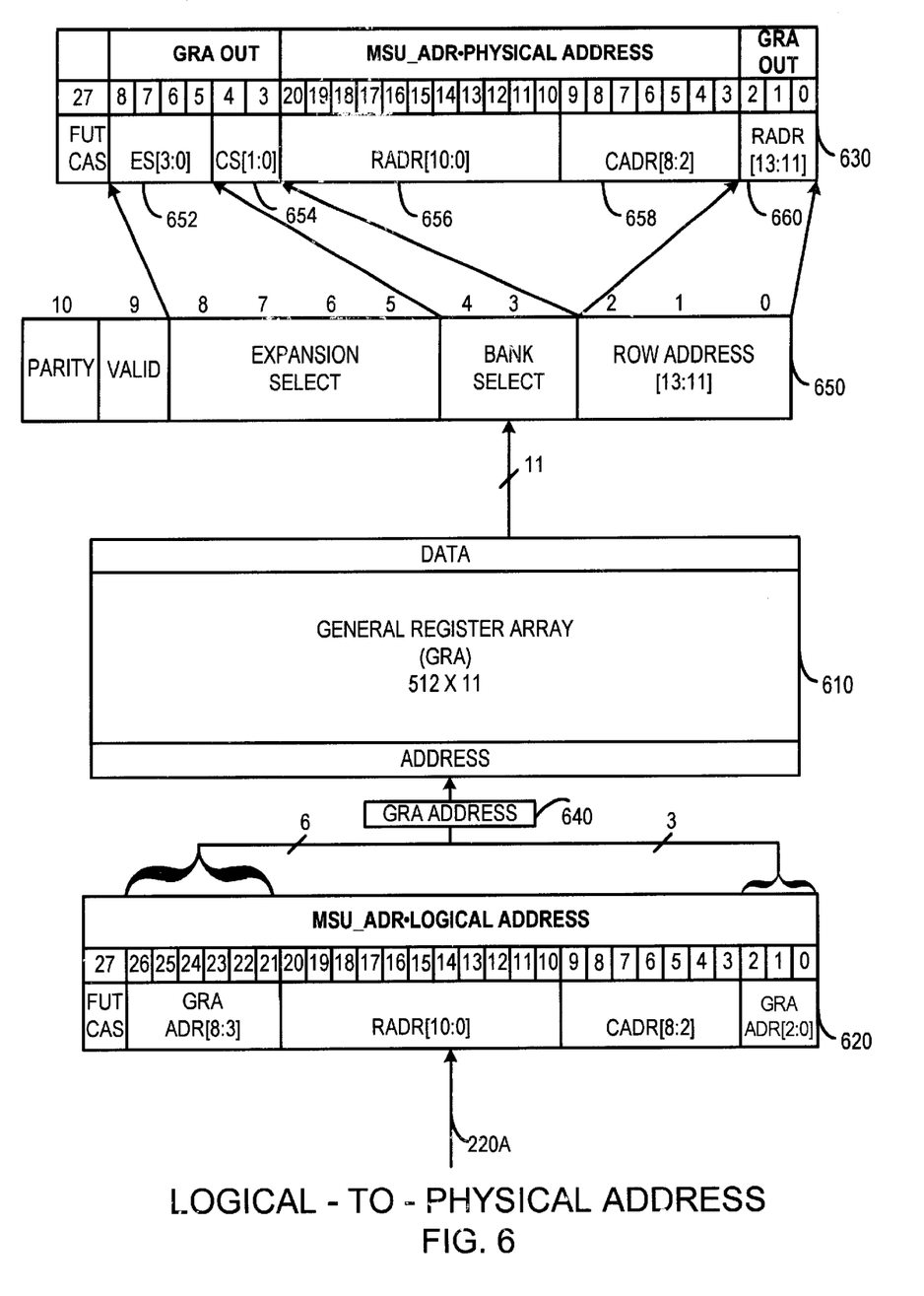
FIG. 6 is a block diagram showing the logical-to-physical address translation algorithm performed by the system of the current invention.

FIG. 6 is a block diagram showing the logical-to-physical address translation algorithm performed by the system of the current invention. The system utilizes a General Register Array (GRA) 610, which is a random access memory device that in the preferred embodiment has the dimensions of 512×11 bits. GRA converts Logical Address 620 to Physical Address 630 by using a first predetermined set of the bits from the Logical Address as an address to the GRA. This address is applied to the GRA to read eleven bits from the GRA, predetermined ones of which are substituted for the bits used as the GRA address.

The address translation algorithm can further be understood by considering the memory system of the preferred embodiment. In the MSU 110 of the preferred embodiment, all memory operations are performed on addressable 64-byte cache lines. Therefore, twenty-one address bits must be provided to a 128 Mbyte Memory Bank 320 to address a cache line. In addition, six address bits are required to select one of sixty-four Memory Banks 320 within an MSU. The total required address is therefore twenty-seven bits wide.

The Logical Address 620 represents the address as issued by a POD 120. The least significant bits 0 through 20 provide the 21-bit cache line address. Bits 21 through 26 provide the Memory Bank selection, and bit 27 is reserved for further use.

Address translation occurs by concatenating Logical Address bits 0–2 and 21–26 to form a 9-bit GRA Address 640 to thereby read 11 bits of GRA Data 650. Bits 5–8 of GRA Data 650 are then substituted for bits 26–23 of the Logical Address to create the ES[3:0] Field 652 used to select one of sixteen MSU Expansions 310. Bits 4–3 of GRA Data 650 are substituted for bits 21–22 of the Logical Address to created the CS[1:0] Field 654 used to select one of four Memory Banks within an MSU Expansion. Logical Address bits 10–20 are retained to provide the row address bits 10–20, shown as Radr[10:0] 656, which is the row address commonly used by matrix-style random access memory devices. Similarly, Logical Address bits 3–9 are retained to provide the most significant column address bits 3–9 shown as Cadr[6:2] 658. GRA Data bits 2–4 are substituted for the least significant bits 0–2 shown as Radr [13:11] 660.

Two additional bits are included within GRA Data 650. Bit 1 is a valid bit which is set if the GRA Data is valid. This bit is cleared if the address within the GRA does not contain valid address translation data, as would occur when one or more of the 128 Mbyte Memory Banks are not present within an MSU. Bit 0 is a parity bit which in the system of the preferred embodiment provides odd parity for the other ten data bits.

From the above explanation, it becomes readily apparent to one skilled in the art that 128 Mbyte Memory Banks may be allocated to another logical address by storing the appropriate data within bits 3–8 of GRA Data 650. If this were the only mapping function being performed, only one addressable GRA location would be required for each of the 128 Mbyte Memory Banks. However, the GRA also implements a programmable interleaving scheme which provides up to eight-way interleaving through the use of GRA Data bits 0–2 and 5–8. This ability to provide between two-way and eight-way interleaving requires that eight addressable locations be provided within GRA 610 for each Memory Bank 320. Thus the data required for 64 Memory Banks utilizes all 512 addressable locations within GRA 610. This will become readily apparent from the following examples.

Figure 7:
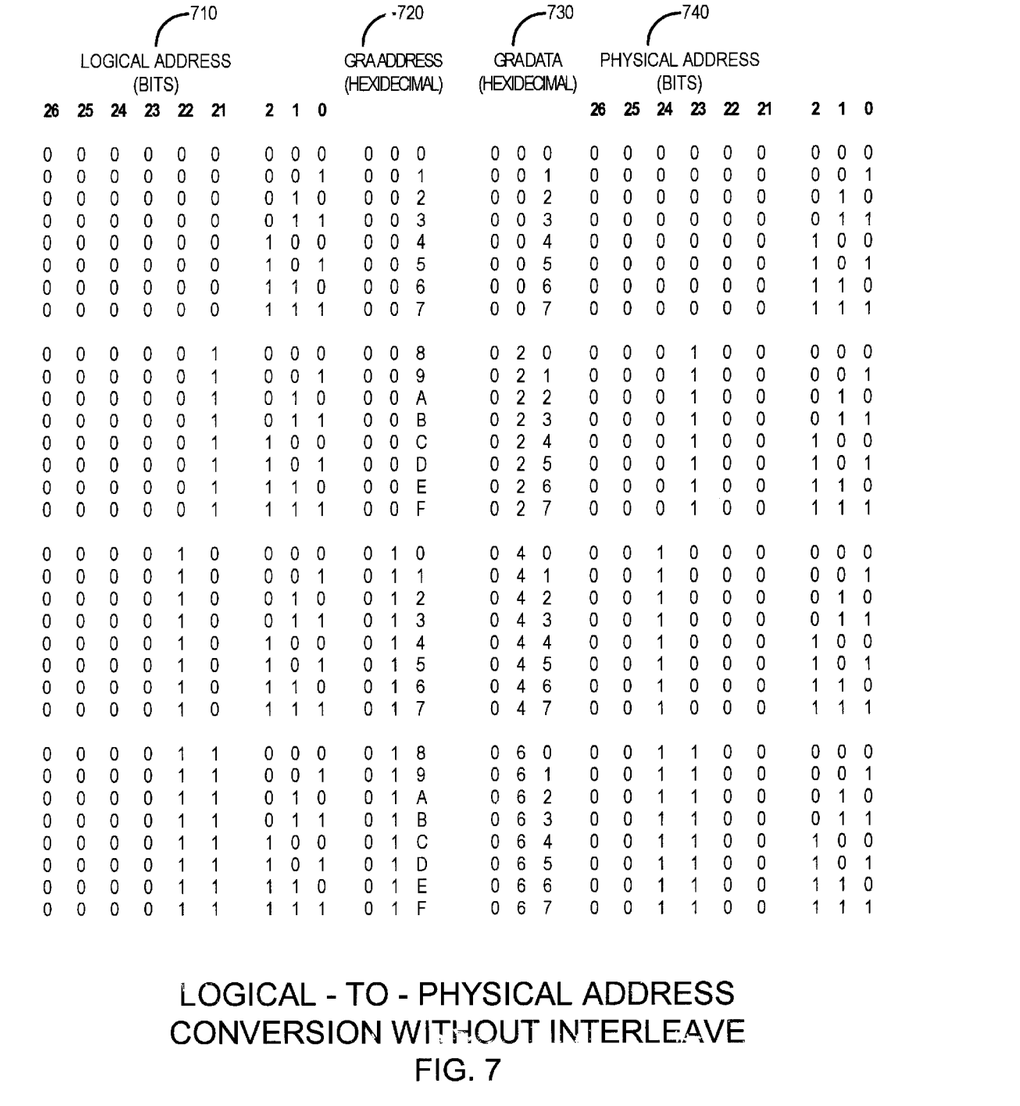
FIG. 7 is a table illustrating logical-to-physical address conversion when interleaving is not employed.

FIG. 7 is a table illustrating logical-to-physical address conversion when interleaving is not employed. Column 710 illustrates bits 26–21 and 2–0 of Logical Address 620. Bits 20–3 are not shown because these bits are not involved in the conversion algorithm. Bits 26–21 and 2–0 are shown concatenated to form GRA Address 640, illustrated in column 720 in hexidecimal. The GRA Data 650 associated with GRA Address 640 is illustrated in column 730 in hexidecimal. The GRA Data becomes bits 26–21 and 2–0 of Physical Address 630 as shown in column 740.

FIG. 7 exemplifies the manner in which GRA 610 is programmed to accomplish the logical-to-physical memory address mapping of FIG. 5. When comparing FIG. 5 to FIG. 7, it should be remembered that FIG. 5 illustrates memory mappings in bytes, whereas Logical Address 620 and Physical Address 740 of FIG. 7 address 64-byte cache lines. That is, an address shown in the table of FIG. 7 may be obtained from a corresponding address of FIG. 5 by dividing by 64.

As shown by FIGS. 5 and 7, logical cache line address 0 maps to physical cache line address 0, logical cache line address 1 maps to physical cache line address 1, and so on because in this example no interleaving is performed. In other words, bits 2–0 of the Logical and Physical Addresses are equivalent. The one-to-one mapping of bits 2–0 is accomplished by the first seven addressable locations within GRA 610 as shown by the first eight rows of the table of FIG. 7.

At the logical address of $128 \times 2^{20}$ bytes, which is the first addressable location of the second 128 Mbyte memory block, the logical cache line address of $2 \times 2^{20}$ is mapped to physical cache line address $8 \times 2^{20}$. This creates a contiguous logical address space. Again, since no interleaving is being performed, logical address 0 maps to physical address 0, logical address 1 maps to physical address 1, and so on within this second 128 Mbyte memory block. This is performed by address locations 008–00F hexidecimal of GRA 610 as shown in rows 9–16 of the table of FIG. 7.

In a similar manner, conversions are performed for the second and third 128 Mbyte Memory Banks to create a contiguous logical address space. Since no interleaving is performed, bits 2–0 of Logical Address 620 correspond to bits 2–0 of Physical Address 630 as shown in columns 710 and 740, respectively of FIG. 7.

Finally, it may be noted that in this example, Memory Bank 320A of MSU Expansion 310A maps to the physical address 0 which is also chosen as the base address for the logical address map. However, this is not a requirement, since the above algorithm will map any physical address starting on a 128 Mbyte boundary to any other predetermined logical base address also starting on a 128 Mbyte boundary.

FIG. 8 is a table illustrating logical-to-physical address conversion when four-way interleaving is employed. This table includes information similar to that shown in the table of FIG. 7. Because interleaving is employed in this example, the contiguous addresses within the first logical 128 Mbyte block of logical memory is interleaved between the four Memory Banks 320A of MSU Expansions 310A, 310B, 310C, and 310D. This interleaved address mapping is shown by physical address bits 26–23 which performs the MSU Expansion selection of MSU Expansions 310A, 310B, 310C, and 310D in succession. The interleaved mapping is further evident by comparing logical address bits 2–0 to physical address bits 2–0. Four contiguous logical cache line addresses are mapped to the same physical cache line address within different MSU Expansions. For example, the first four logical cache line addresses 0–3 shown within rows 0–3 of FIG. 8 map to the first cache line address 0 within each of the MSU Expansions 310A, 310B, 310C, and 310D.

The first eight rows of the table of FIG. 8 shows memory mapping for the first 128 Mbytes of logical memory. The second, third, and fourth eight-row groups of this table illustrate the memory mapping for the second, third, and fourth 128 Mbytes of logical memory respectively.

It may be noted that interleaved memory mapping may be selected for any number of MSU Expansions between two and $2^N$, where N is the number of bits allotted for storing data to accomplish the interleave function. Since in the preferred embodiment three bits are utilized for this function, between two-way and eight-way interleaving may be accomplished in this implementation. For example, three or five-way interleaving can be accomplished just as easily as two or four-way interleaving by re-programming GRA 610. Thus, as more memory is added to the system, or as memory is degraded and thereafter removed from the system, memory may be re-mapped with a new interleaving scheme to accommodate system requirements. Furthermore, the interleave mapping may be enabled as performance issues arise. For example, if newly added software creates additional memory demands that diminish throughput, the memory mapping scheme may be modified from non-interleaved to interleaved without removing power from the system. This dynamic modification to GRA 610 is discussed further below.

Figure 9:
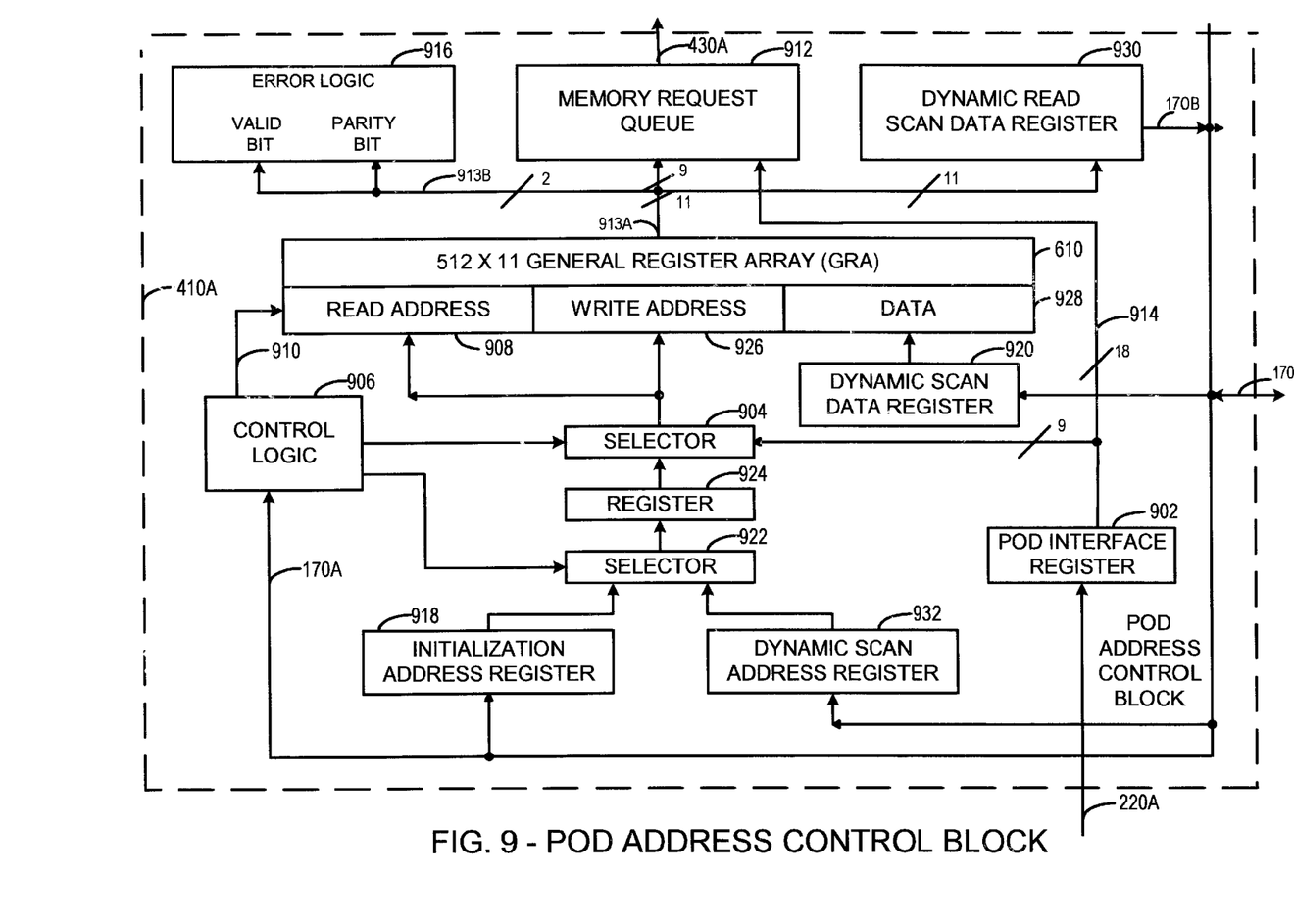
FIG. 9 is a block diagram of the address translation logic included within the Processor Module (POD) Address Control Block of MCA.

FIG. 9 is a block diagram of the address translation logic included within POD Address Control Block 410A of MCA 250. Although POD Address Control Block 410A is shown and described, similar address translation logic is included within all other POD Address Control Blocks.

Logical Address 620 is received by POD Address Control Block 220A from POD 120A on Address/command Lines 220A and latched within POD Interface Register 902. Bits 26–21 and 2–0 of Logical Address are provided to Selector 904. Control Logic 906 controls the selection of these address bits from POD Interface Register 902 during normal system operations. These bits are provided by Selector 904 to the Read Address Port 908 of GRA 610. Control Logic 906 provides control signals on Line 910 to GRA 610 to read the GRA Data 650. Bits 8–0 of GRA Data 650 are provided to Memory Request Queue 912 on Line 913A where they stored along with the Logical Address bits 20–3 shown provided on Line 914. Bits 8–0 of GRA Data 650 and the associated Logical Address bits 20–3 constitute the Physical Address 630 as discussed in reference to FIG. 6. This Physical Address is selected for presentation to the one of the Memory Cluster Control Blocks 420 associated with the addressed one of the MSU Expansions 310 via the interface shown on Line 430A when the address reaches the top of Memory Request Queue 912.

In addition to bits 8–0, GRA Data 650 further includes Parity and Valid bits 10–9, which are provided to Error Logic 916 on Line 913B to determine whether a parity error occurred, or whether an attempt was made to address non-existing memory. If either of these errors are detected, an error signal is provided to the requesting POD 120.

POD Address Control Block 410A further includes programming logic to accomplish the initialization of GRA 610. During system initialization, Support Processor 160 reads the Dynamic Scan Register 290 (FIG. 2) of MSU 110A to determine the number of Memory Banks 320 which are physically present in the system. Using this information, Support Processor re-maps physical addresses to logical addresses by removing the unused physical address ranges. The algorithm used to perform this address re-mapping is shown in detail in FIGS. 5 and 7. This algorithm, along with the selection to be used for interleaving, determines the contents of GRA 610 as is shown in FIG. 7 and described above. The Support Processor then initializes the GRA by writing the Initialization Address Register 918 and the Dynamic Scan Data Register 920 with the appropriate GRA Address 640 and calculated GRA Data 650, respectively, via Scan Interface 170. Scan Interface 170 includes control signals shown on Line 170A which are provided to Control Logic 906 to cause selection of the GRA Address by Selector 922, and the capture of this address by Register 924. Control Logic 906 further controls selection of the GRA Address by Selector 904, and provides control signals on Line 910 to enable reception of GRA Data on Data Port 928. This process is repeated for every addressable location within GRA 610. The Support Processor verifies initialization of GRA 610 by reading the GRA Data via dynamic Read Scan Data Register 930 and Line 170B.

As discussed above, some or all of the General Register Array addressable locations may be re-written with new GRA Data during system operations without removing power. This may be desirable to modify the interleave scheme, or to re-map memory to remove a degraded Memory Bank 320 from the memory map. To perform the re-mapping of memory within MCL 235A, all memory requests made by the PODs 120 to MCL 235A must be stopped. Then Support Processor 160 writes the GRA Address 640 into Dynamic Scan Address Register 932 via Scan Interface 170. The Support Processor further writes the Dynamic Scan Data Register 920 with GRA Data 650. Scan control is provided on Line 170A to Control Logic 906 which causes Selector 922 to select the GRA address from Dynamic Scan Address Register 932. The selected GRA address is latched in Register 924, selected by Selector 904, and provided to Write Address Port 926. GRA Data from Dynamic Scan Data Register 920 is written to GRA 610 as controlled by control signals shown on Line 910. This process is repeated for every location within GRA 610.

It may be noted that because GRA 610 controls the address mapping for its respective one of MSUs 110, some MSUs within Platform 100 may be programmed to perform address translation in interleaved mode, and other MSUs may be programmed in non-interleaved mode. Moreover, different interleave modes (e.g., 3-way versus 4-way) may be chosen for different MSUs. Finally, since memory mapping functions are dynamically re-programmed for each MSU independently, memory translation functions may be re-programmed for one MSU while memory operations continue uninterrupted to all other MSUs in the system.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

What is claimed is:

1. For use in a data processing system having a main memory for receiving memory requests to read from, or write to, a selectable physical address within the main memory, the data processing system further having one or more processors for submitting requests to the main memory, the processors having substantially uniform access to said selectable physical address within said main memory, the requests being associated with selectable logical addresses each including logical address signals indicative of an address within a memory map of the one or more processors, a programmable logical-to-physical address translation system, comprising:

multiple programmable logic circuits each to receive and store programmed data signals, each said programmable logic circuit coupled to the one or more processors to receive predetermined respective ones of the selectable logical addresses from each of the one or more processors; and multiple control circuits each coupled to a respective one of said programmable logic circuits to provide control signals to said respective one of said programmable logic circuits, said control signals and said predetermined ones of the selectable logical address signals to cause said respective one of said programmable logic circuits to provide ones of said programmed data signals to replace said predetermined ones of the logical address signals and whereby said each of said predetermined respective ones of the selectable logical addresses are translated into an associated one of the selectable physical addresses.

2. For use in a data processing system having a main memory for receiving memory requests to read from or write to a selectable physical address within the main memory wherein the selectable physical address includes physical address signals necessary to enable the main memory at the selectable physical address, the data processing system further having one or more requesting processor units for submitting requests to the main memory, each of said one or more requesting processor units having substantially uniform access to all selectable physical addresses within said main memory, each of the requests being associated with a selectable logical address including logical address signals indicative of an address within the memory map of the one or more requesting processor units, a programmable logical-to-physical address translation system, comprising:

programmable address translation means for storing programmed data signals, said programmable address translation means coupled to the one or more requesting processor units for receiving predetermined ones of the selectable logical addresses, predetermined ones of the logical address signals within each of said predetermined ones of the selectable logical addresses for addressing said programmable address translation means; and control means coupled to said programmable address translation means for providing control signals to said programmable address translation means, said programmable address translation means utilizing said control signals and said predetermined ones of the selectable logical address signals to provide selectable ones of said programmed data signals, said selectable ones of said programmed data signals for replacing said predetermined ones of the logical address signals included within an associated one of said predetermined ones of the selectable logical addresses to form an associated selectable physical address.

3. The programmable logical-to-physical address translation system of claim 2, and further including programming means coupled to said programmable address translation means for supplying said programmed data signals and for selectively enabling said programmed data signals.

4. The programmable logical-to-physical address translation system of claim 3, wherein said programming means includes means for supplying said programmed data signals and for selectively enabling storage of said programmed data signals during normal system operations of the data processing system.

5. The programmable logical-to-physical address translation system of claim 2, wherein said programmable address translation means includes means for storing ones of said programmed data signals capable of translating contiguous ones of the logical addresses into non-contiguous ones of the physical addresses.

6. The programmable logical-to-physical address translation system of claim 2, wherein said programmable address translation means includes means for storing ones of said programmed data signals capable of translating a block of contiguous logical addresses starting at a first predetermined logical address into a block of contiguous physical addresses starting at a second predetermined physical address.

7. For use in a data processing system having a main memory separated physically from one or more requesting processor units for receiving memory requests to read from, or write to, a selectable physical address within the main memory wherein the selectable physical address includes physical address signals necessary to enable the main memory at the selectable physical address, the data processing system further having said one or more requesting processor units for submitting requests to the main memory through substantially equivalent access to all of said main memory, the requests being associated with selectable logical addresses each including logical address signals indicative of an address within a memory map of the one or more requesting units, a programmable logical-to-physical address translation system, comprising:

a programmable logic circuit to receive and store programmed data signals, said programmable logic circuit coupled to the one or more requesting processor units to receive predetermined ones of the selectable logical addresses, predetermined ones of the logical address signals within each of said predetermined ones of the selectable logical addresses to address said programmable logic circuit; and a control circuit coupled to said programmable logic circuit to provide control signals to said programmable logic circuit, said control signals and said predetermined ones of the selectable logical address signals to cause said programmable logic circuit to provide selectable ones of said programmed data signals, said selectable ones of said programmed data signals to replace said predetermined ones of the logical address signals included within said each of said predetermined ones of the selectable logical addresses to thereby translate said each of said predetermined ones of the selectable logical addresses into an associated one of the selectable physical addresses.

8. The programmable logical-to-physical address translation system of claim 7, and further including a programming circuit coupled to said programmable logic circuit to supply said programmed data signals to said programmable logic circuit and to selectively enable said programmable logic circuit to receive said programmed data signals.

9. The programmable logical-to-physical address translation system of claim 8, wherein said programming circuit includes circuits to supply said programmed data signals to said programmable logic circuit and to selectively enable said programmable logic circuit to receive said programmed data signals during normal system operations of the data processing system.

10. The programmable logical-to-physical address translation system of claim 7, wherein said programmable logic circuit includes circuits to store ones of said programmed data signals capable of translating contiguous ones of the logical addresses into non-contiguous ones of the physical addresses.

11. The programmable logical-to-physical address translation system of claim 7, wherein said programmable logic circuit includes circuits to store ones of said programmed data signals capable of translating a block of contiguous logical addresses starting at a first predetermined logical address into a block of contiguous physical addresses starting at a second predetermined physical address.

12. The programmable logical-to-physical address translation, system of claim 7, wherein said programmable logic circuit is a general register array.

13. A main memory system for use in a data processing system having multiple requesting units for providing logical addresses each including logical address signals to read data signals or write data signals within a main memory system to which said multiple requesting units have substantially uniform access, comprising:

one or more programmable address translation circuits, each of said programmable address translation circuits including multiple addressable storage locations, each of said multiple addressable storage locations to store a predetermined number of programmable data signals, said one or more programmable address translation circuits each coupled to predetermined ones of the multiple requesting units and arranged to receive logical addresses, predetermined ones of the logical address signals included within each said received logical address to be used as an address to select a selected one of said multiple addressable storage locations;

one or more control circuits, each of said control circuits coupled to an associated different one of said one or more programmable address translation circuits to enable said predetermined number of programmable data signals to be read from said selected one of said multiple addressable storage locations within said associated different one of said one or more programmable address translation circuits and predetermined ones of said predetermined number of programmable data signals read from said selected one of said multiple addressable storage locations to be substituted for said predetermined ones of the logical address signals within said received logical address to thereby provide an associated physical address indicative of said received logical address, said physical address being provided in a manner that is transparent to the operation of any of the requesting units; and one or more memory storage devices, each coupled to an associated one of said one or more programmable address translation circuits to receive, and be enabled by different associated ones of said associated physical addresses provided by said associated one of said one or more programmable translation circuits, whereby each of said associated physical addresses provided by said associated one of said one or more programmable address translation circuits is provided to an associated one of said one or more memory storage devices to read data signals from, or write data signals to, said associated one of said one or more memory storage devices.

14. The main memory system of claim 13, and further comprising one or more logical address storage devices, each of said logical address storage devices coupled to predetermined ones of the multiple requesting units to temporarily store logical addresses received from said predetermined ones of the multiple requesting units, said one or more logical address storage devices each coupled to an associated different one of said one or more programmable address translation circuits to provide stored ones of the logical addresses to said associated different one of said one or more programmable address translation circuits to each be translated into said associated physical address.

15. The main memory system of claim 13, and further comprising one or more physical address storage devices, each of said address physical storage devices coupled to an associated different one of said one or more programmable address translation circuits to store a predetermined number of said associated physical addresses provided by said associated different one of said one or more programmable address translation circuits, said one or more physical address storage devices each further coupled to different associated ones of said one or more memory storage devices to provide a stored one of said associated physical addresses to an associated one of said one or more memory storage devices when said associated ones of said one or more memory storage devices becomes available to receive another one of said associated physical addresses.

16. The main memory system of claim 13, and further comprising one or more programming circuits, each of said programming circuits coupled to associated ones of said one or more programmable address translation circuits and being capable of writing said predetermined number of programmable data signals to each of said multiple addressable storage locations within said associated ones of said one or more programmable address translation circuits.

17. The main memory system of claim 16, and further comprising a support processor coupled to said one or more programming circuits and being capable of controlling the writing of said predetermined number of programmable data signals to each of said multiple addressable storage locations within each of said one or more programmable address translation circuits.

18. The main memory system of claim 16, wherein said one or more programming circuits are scan-set programming circuits.

19. The main memory system of claim 16, wherein each of said one or more programmable address translation circuits is a programmable memory device.

20. The main memory system of claim 19, wherein each said one or more programmable memory device is a general register array.

21. The main memory system of claim 13, wherein each of said one or more programmable address translation circuits includes interleave storage circuits associated with each of said multiple addressable storage locations to store N data signals where N is an integer greater than 0, and whereby selected ones of said one or more programmable address translation circuits may be programmed to store N interleave enable bits in said interleave storage circuits whereby N contiguous logical addresses may be received by a selectable one of said selected ones of said one or more programmable address translation circuits, and whereby each associated physical address provided by said selectable one of said selected ones of said one or more programmable address translation circuits for each received one of said N contiguous logical addresses includes said N interleave enable bits to enable between two and $2^N$ different ones of said associated one or more memory storage devices coupled to said selectable one of said one or more selected ones of said programmable address translation circuits to thereby provide between two-way and $2^N$-way address interleaving, respectively.

22. The main memory system of claim 21, wherein said interleave storage circuits of all other ones of said one or more programmable address translation circuits may be programmed to store N non-interleave enable bits, and whereby said N contiguous logical addresses may be received by a selectable one of said all other ones of said one or more programmable address translation circuits, and whereby each associated physical address provided for each received one of said N contiguous logical addresses by said selectable one of said all other ones of said one or more programmable address translation circuits includes said N non-interleave enable bits to enable one of said associated one or more memory storage devices coupled to said selectable one of said all other ones of said one or more programmable address translation circuits and whereby all said associated physical addresses provided for each received one of said N contiguous logical addresses are contiguous physical addresses.

23. The main memory system of claim 13, wherein each of said multiple addressable storage locations includes circuits to store a programmable signal indicating whether said each of said predetermined number of programmable data signals includes valid data signals.

24. The main memory system of claim 13, wherein each of said multiple addressable storage locations further includes circuits to store a predetermined number of programmable signals providing parity error detection for said each of said predetermined number of programmable data signals.

25. Memory system and address translation circuitry for use in a data processing system having multiple requesting units for providing logical addresses each including logical address signals to read data signals or write data signals within a main memory system, wherein said multiple requesting units have substantially uniform access to said main memory system and wherein said main memory system is not within said requesting units, comprising:

one or more programmable address translation circuits, each of said programmable address translation circuits including multiple addressable storage locations, each of said multiple addressable storage locations to store a predetermined number of programmable data signals, said one or more programmable address translation circuits each coupled to predetermined ones of the multiple requesting units and arranged to receive logical addresses, predetermined ones of the logical address signals included within each said received logical address to be used as an address to select a selected one of said multiple addressable storage locations;

one or more control circuits, each of said control circuits coupled to an associated different one of said one or more programmable address translation circuits to enable said predetermined number of programmable data signals to be read from said selected one of said multiple addressable storage locations within said associated different one of said one or more programmable address translation circuits and predetermined ones of said predetermined number of programmable data signals read from said selected one of said multiple addressable storage locations to be substituted for said predetermined ones of the logical address signals within said received logical address to thereby provide an associated physical address indicative of said received logical address;

one or more memory storage devices, each coupled to an associated one of said one or more programmable address translation circuits to receive, and be enabled by different associated ones of said associated physical addresses provided by said associated one of said one or more programmable translation circuits, whereby each of said associated physical addresses provided by said associated one of said one or more programmable address translation circuits is provided to an associated one of said one or more memory storage devices to read data signals from, or write data signals to, said associated one of said one or more memory storage devices; and one or more physical address storage devices, each of said address physical storage devices coupled to an associated different one of said one or more programmable address translation circuits to store a predetermined number of said associated physical addresses provided by said associated different one of said one or more programmable address translation circuits, said one or more physical address storage devices each further coupled to different associated ones of said one or more memory storage devices to provide a stored one of said associated physical addresses to an associated one of said one or more memory storage devices when said associated ones of said one or more memory storage devices becomes available to receive another one of said associated physical addresses.

26. For use in a data processing system having multiple requesters for providing logical addresses each including logical address signals to read data signals or write data signals within a main memory system, comprising:

one or more programmable address translation circuits, each of said programmable address translation circuits including multiple addressable storage locations, each of said multiple addressable storage locations to store a predetermined number of programmable data signals, said one or more programmable address translation circuits each coupled to predetermined ones of the multiple requesters and arranged to receive logical addresses, predetermined ones of the logical address signals included within each said received logical address to be used as an address to select a selected one of said multiple addressable storage locations;

one or more control circuits, each of said control circuits coupled to an associated different one of said one or more programmable address translation circuits to enable said predetermined number of programmable data signals to be read from said selected one of said multiple addressable storage locations within said associated different one of said one or more programmable address translation circuits and predetermined ones of said predetermined number of programmable data signals read from said selected one of said multiple addressable storage locations to be substituted for said predetermined ones of the logical address signals within said received logical address to thereby provide an associated physical address indicative of said received logical address;

one or more memory storage devices, each coupled to an associated one of said one or more programmable address translation circuits to receive, and be enabled by different associated ones of said associated physical addresses provided by said associated one of said one or more programmable translation circuits, whereby each of said associated physical addresses provided by said associated one of said one or more programmable address translation circuits is provided to an associated one of said one or more memory storage devices to read data signals from, or write data signals to, said associated one of said one or more memory storage devices; and wherein each of said one or more programmable address translation circuits includes interleave storage circuits associated with each of said multiple addressable storage locations to store N data signals where N is an integer greater than 0, and whereby selected ones of said one or more programmable address translation circuits may be programmed to store N interleave enable bits in said interleave storage circuits whereby N contiguous logical addresses may be received by a selectable one of said selected ones of said one or more programmable address translation circuits, and whereby each associated physical address provided by said selectable one of said selected ones of said one or more programmable address translation circuits for each received one of said N contiguous logical addresses includes said N interleave enable bits to enable between two and $2^N$ different ones of said associated one or more memory storage devices coupled to said selectable one of said one or more selected ones of said programmable address translation circuits to thereby provide between two-way and $2^N$-way address interleaving, respectively.

27. The main memory system of claim 26, wherein said interleave storage circuits of other ones of said one or more programmable address translation circuits may be programmed to store N non-interleave enable bits, and whereby said N contiguous logical addresses may be received by a selectable one of said all other ones of said one or more programmable address translation circuits, and whereby each associated physical address provided for each received one of said N contiguous logical addresses by said selectable one of said all other ones of said one or more programmable address translation circuits includes said N non-interleave enable bits to enable one of said associated one or more memory storage devices coupled to said selectable one of said all other ones of said one or more programmable address translation circuits and whereby all said associated physical addresses provided for each received one of said N contiguous logical addresses are contiguous physical addresses.

* * * * *